(12) United States Patent
Brubaker et al.

(10) Patent No.: US 10,174,861 B2
(45) Date of Patent: Jan. 8, 2019

(54) GEARED INTERFACE FOR VALVE

(71) Applicant: Bendix Commercial Vehicle Systems LLC, Elyria, OH (US)

(72) Inventors: Christopher L. Brubaker, Lakewood, OH (US); Eugene E. Clair, Berea, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 149 days.

(21) Appl. No.: 15/263,443

(22) Filed: Sep. 13, 2016

(65) Prior Publication Data
US 2018/0073660 A1    Mar. 15, 2018

(51) Int. Cl.
*F16K 31/52* (2006.01)
*F16K 31/524* (2006.01)
*F16H 19/08* (2006.01)
*F16H 55/08* (2006.01)
*F16H 35/00* (2006.01)
(Continued)

(52) U.S. Cl.
CPC ....... *F16K 31/52483* (2013.01); *F16H 19/08* (2013.01); *F16H 35/00* (2013.01); *F16H 35/18* (2013.01); *F16H 55/084* (2013.01); *F16H 55/566* (2013.01); *F16K 11/065* (2013.01);
(Continued)

(58) Field of Classification Search
CPC .. F16K 31/52483; F16K 31/56; F16K 11/065; F16K 11/07; F16K 31/53; F16H 55/084; F16H 19/08; F16H 35/00; F16H 2035/003; F16H 35/18; F16H 55/566; G05G 1/08; Y10T 137/87169; Y10T 137/87233

USPC .......... 137/596, 596.1, 596.2; 251/251, 262, 251/263, 254, 231, 240
See application file for complete search history.

(56) References Cited

U.S. PATENT DOCUMENTS 4,028,019 A   6/1977  Wildhaber
4,031,345 A   6/1977  Garcia
(Continued)

OTHER PUBLICATIONS

United States Patent and Trademark Office "Office action Summary for U.S. Appl. No. 15/263,433", dated Aug. 10, 2017, 15 pages, USPTO, USA.
(Continued)

*Primary Examiner* — Craig J Price
*Assistant Examiner* — Andrew J Rost
(74) *Attorney, Agent, or Firm* — Cheryl L. Greenly; Brian E. Kondas; Eugene E. Clair

(57) ABSTRACT

An actuation mechanism for a valve comprises a first member having a generally spherical surface on a first side of a bisecting line and a generally ellipsoidal surface on a second side of the bisecting line. The first member is rotatable around a central point of the bisecting line. The valve has a second member with a truncated ellipsoidal surface on both sides of a bisecting line. The second member matingly engages the first member at the first member ellipsoidal surface. The valve also includes a longitudinal member coupled to the second member and a biasing member coupled to the longitudinal member. The first member is rotated around the central point from a first position to a second position to move the second member and the longitudinal member linearly. The biasing member returns the first member and second member to the first position upon release of the first member.

15 Claims, 4 Drawing Sheets

(51) Int. Cl.
*F16K 11/065* (2006.01)
*F16H 35/18* (2006.01)
*F16H 55/56* (2006.01)
*F16K 11/07* (2006.01)

(52) U.S. Cl.
CPC ........ *F16K 11/07* (2013.01); *F16H 2035/003* (2013.01)

(56) References Cited

U.S. PATENT DOCUMENTS

| | | | |
|---|---|---|---|
| 4,250,923 A * | 2/1981 | Johnson | ............ F16K 31/52483 137/625.69 |
| 4,545,402 A | 10/1985 | Lyons | |
| 4,606,369 A | 8/1986 | McKay | |
| 4,838,226 A | 6/1989 | Matsuzawa | |
| 4,844,708 A | 7/1989 | Lopez | |
| 4,867,002 A | 9/1989 | Bouchet | |
| 5,048,556 A * | 9/1991 | Grumelot | ................. B63B 13/00 114/197 |
| 5,517,931 A * | 5/1996 | Kawaguchi | ............... F04B 9/02 111/118 |
| 5,758,684 A | 6/1998 | Hudson | |
| 5,809,780 A | 9/1998 | DeJong | |
| 5,950,765 A | 9/1999 | Person | |
| 6,021,683 A * | 2/2000 | Doege | ........................ B21J 9/18 100/282 |
| 6,048,186 A | 4/2000 | Kitano | |
| 6,095,488 A | 8/2000 | Semeyn | |
| 6,974,119 B2 | 12/2005 | Brendle | |
| 7,038,846 B2 | 5/2006 | Mandella | |
| 7,066,301 B2 | 6/2006 | Oh | |
| 7,575,285 B2 | 8/2009 | Bobby | |
| 8,312,785 B2 | 11/2012 | Breeser | |
| 8,840,197 B2 | 9/2014 | Eberling | |
| 9,227,312 B2 | 1/2016 | Wang | |
| 2003/0150315 A1 * | 8/2003 | Lin | ...................... B21D 28/002 83/628 |
| 2006/0058105 A1 | 3/2006 | Evans | |
| 2007/0056558 A1 | 3/2007 | Kondo | |
| 2008/0245174 A1 | 10/2008 | Fischer | |
| 2012/0137996 A1 | 6/2012 | Yang | |
| 2013/0133763 A1 | 5/2013 | Sulmone | |
| 2014/0290974 A1 | 10/2014 | Eriksson | |
| 2016/0159334 A1 | 6/2016 | Lichtenburg | |

OTHER PUBLICATIONS

Bendix Commercial Vehicle Systems LLC, "Bendix TCS-9000 Control Brake Valve," Service Data Sheet, Jun. 2005, 4 pages, Bendix Commercial Vehicle Systems LLC, Elyria OH USA.

\* cited by examiner

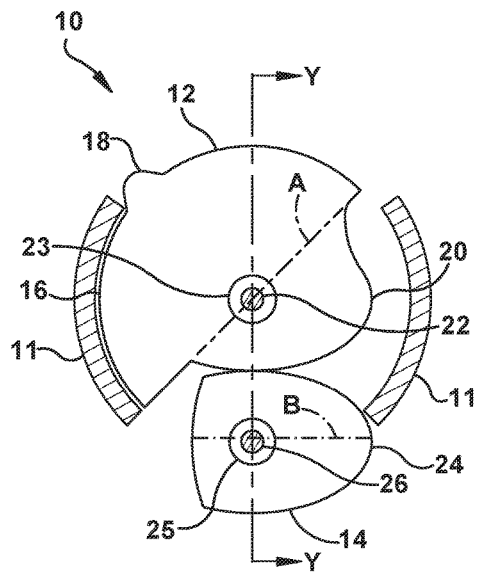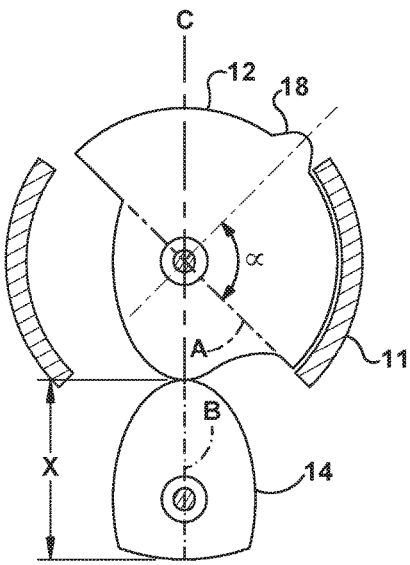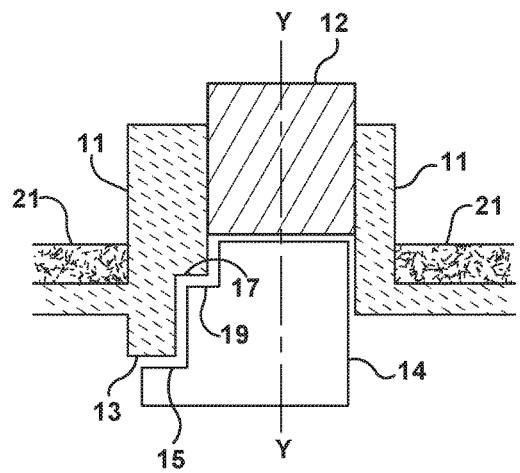
Fig. 2A
Fig. 3
Fig. 2B

GEARED INTERFACE FOR VALVE

BACKGROUND

The present invention relates to embodiments of a geared interface for a valve, specifically for a fluid control valve. A control valve that uses a cam/cam follower system to translate rotational motion into linear motion to actuate the control valve requires a relatively long application lever to ensure that the operator can comfortably control the valve and overcome the inherent resistance in the cam/cam follower system. These types of valves require a relatively large amount of space in a dashboard installation for the valve to achieve its full range of motion and operate effectively. There is a need for a valve that can be manually controlled by an operator to translate rotational motion into linear motion, while requiring a minimum amount of space.

SUMMARY

Various embodiments of an actuation mechanism for a valve comprise a first member having a bisecting line, the first member having a generally spherical surface on a first side of the bisecting line and a generally ellipsoidal surface on a second side of the bisecting line. The first member is rotatable around a central point of the bisecting line. The valve has a second member having a bisecting line and a truncated ellipsoidal surface on both sides of the bisecting line. The second member matingly engages the first member at the first member ellipsoidal surface. The valve also includes a longitudinal member coupled to the second member and a biasing member coupled to the longitudinal member. The first member is rotated around the central point from a first position to a second position to move the second member and the longitudinal member linearly. The biasing member returns the first member and second member to the first position upon release of the first member.

In accordance with another aspect, various embodiments of a valve having a geared actuation mechanism comprise a body having an upper portion and a lower portion; a supply port in the lower portion of the body; an exhaust port in the lower portion of the body; and a delivery port in the lower portion of the body. A first member having a generally ellipsoidal surface on a first side of a bisecting line and a generally spherical surface on a second side of the bisecting line is located at the upper portion of the body and a second member having a generally truncated ellipsoidal surface is also located at the upper portion of the body. The second member engages the first member at the first member ellipsoidal surface. The valve also comprises a longitudinal member coupled to the second member and located in the lower portion of the body and a biasing member coupled to the longitudinal member. The first member is actuated manually to move from a first position to a second position while moving the second member and the longitudinal member linearly, thereby opening a passage between the supply port and the delivery port. The biasing member returns the second member and the first member to a first position upon release of the manual actuation, thereby opening a passage between the delivery port and the exhaust port.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 2A illustrates a gear apparatus in a released position according to one example of the invention.

FIG. 2B illustrates the gear apparatus as in FIG. 2A along line Y-Y.

FIG. 3 illustrates the gear apparatus of FIG. 2A in an applied position.

DETAILED DESCRIPTION

Figure 1:
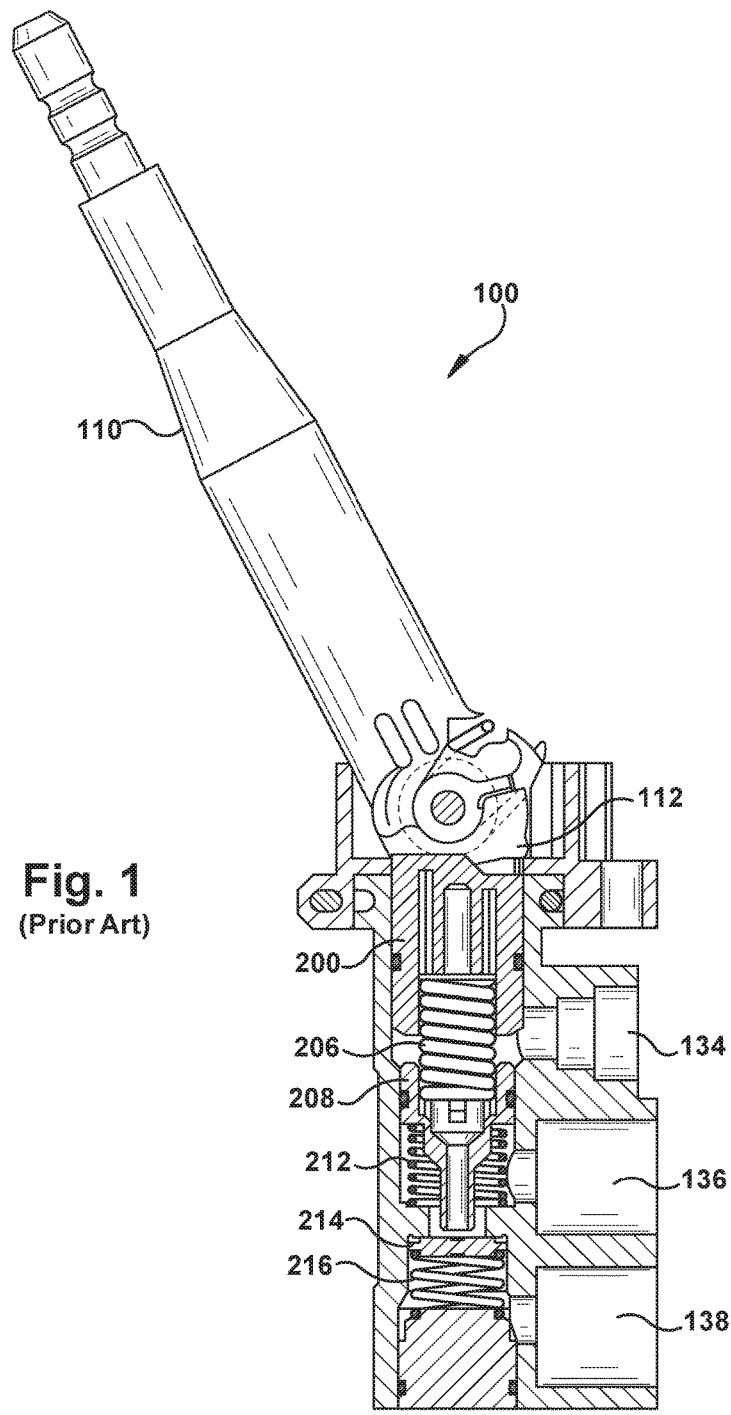
FIG. 1 illustrates a prior art trailer control brake valve.

FIG. 1 illustrates a prior art trailer control brake valve 100 in a released position. The valve 100 includes a handle 110 having a length of about five inches and attached to a first cam 112. To move to an actuated position, the handle 110 is pivoted about 75 degrees to force the first cam gear 112 against the cam follower 200. Graduated spring 206 is compressed to force plunger 208 to move inlet valve 214 to open a pathway between the supply port 138 and delivery port 136. Springs 212 and 216 provide force to return plunger 212 and inlet valve 214 to the released position. The force required to move the handle 110 through the full range of motion is about ten inch pounds, but the force required in not linear through the full range of motion. Some disadvantages of this trailer control brake valve 100 include the relatively long handle and the variable force required to move the handle overcome the friction of the first cam 112 and the cam follower 200. The non-linear motion required to overcome the friction of the cam/cam follower arrangement makes achieving a precise air delivery output difficult.

FIG. 2A illustrates an actuation mechanism in the form of a gear apparatus 10 according to one example of the present invention. The gear apparatus 10 is shown in a first, or released, position. The gear apparatus 10 comprises a first member 12 and a second member 14 that are matingly engaged. First member 12 and second member 14 may be frictionally engaged, meshed together via gear teeth (not shown) on each member or mated by other means.

The first member 12 has a bisecting line A on which lies a central point for rotation. The first member 12 has an aperture 22 at the point for rotation. A pin (not shown) may be inserted into the aperture 22 when the gear apparatus 10 is installed in a housing 11, as will be described. A spring 23 may surround the aperture 22 to return the first member 12 to the first position. The spring 23 may also be coupled to the housing 11.

The diameter of the first member 12 is about 0.75 inches. The first member 12 is not shaped symmetrically around bisecting line A. The first member 12 has a generally elliptical surface 20 on one side of bisecting line A and a generally semi-circular surface 16 on the opposite side of bisecting line A. The generally semi-circular surface 16 presents a uniform surface to the operator of the actuation mechanism through the housing 11 and also minimizes entry of contaminants to the actuation mechanism. The generally semi-circular surface 16 includes a nodule 18 that protrudes slightly from the housing 11 for ease in manual rotation. The nodule 18 is used as a manual means to rotate the first member 12. The nodule 18 may be sized to fit a thumb or may be connected to another operator interface to rotate the first member 12, such as a dial, knob or lever.

The second member 14 has a bisecting line B and is generally symmetrical around bisecting line B. An aperture 26 is located at the point of rotation of the second member 14. A pin (not shown) may be inserted in the aperture 26. However, the second member 14 is not coupled to the housing 11. A spring 25 may be added to assist in returning the second member 14 to the first position.

The diameter of the second member 14 is about 0.75 inches. The second member 14 has a truncated elliptical surface 24. The truncated elliptical surface 24 is shaped to minimize space constraints and interference during rotation of the second member 14. The elliptical shape mirrors the elliptical surface 20 of the first member 12; however the truncated elliptical surface 24 of the second member 14 is slightly smaller than the generally elliptical surface 20 of the first member 12 to achieve mechanical advantage during rotation of the first member 12.

The first member 12 and second member 14 are shown in a released position in FIG. 2A. The points of rotation of the first member 12 and second member 14 are aligned along the same axis in the released position. The first member elliptical surface 20 and second member elliptical surface 24 are also oriented ninety degrees out of phase with each other in the first position to further achieve sufficient linear travel of the second member 14 during rotation of the first member 12.

The first member 12 and the second member 14 may preferably be made from the same material. In one example, the material is a plastic material, such as glass filled nylon, to ensure stability. The first member 12 and the second member 14 may be molded from a plastic material.

FIG. 2B illustrates the gear apparatus 10 of FIG. 2A as shown along the line Y-Y of FIG. 2A and as it would be installed in a dashboard 21. Home features 15, 19 on the second member 14 and complementary home features 13, 17 of the housing 11 are shown. After rotation, the second member 14 will seat on the home feature 13 of the housing 11 first, then seat on the home feature 17 second. The cooperation of the home features 13, 15 and home features 17, 19 ensures that the actuation mechanism will remain in the first position until manually rotated.

In FIG. 3, the gear apparatus 10 is shown with the first member 12 and second member 14 in a second, or fully actuated, position. In the second position, the point of rotation of bisecting line B of the second member 14 remains in the same axis. The first member 12 is rotated an angle alpha around the central point of rotation of bisecting line A. In one example, the angle alpha is about 90 degrees from the position of bisecting line A in the first position of FIG. 2A.

The second member 14 travels in a linear manner in response to the rotation of the first member 12. The movement of second member 14 from the released position in FIG. 2A to the fully actuated position of FIG. 3 is relatively linear as the ellipsoidal surface of the first member 12 rotates against the ellipsoidal surface of the second member 14. The amount of linear travel, X, is based on the dimensions of the first member 12 and second member 14. In one example, the linear travel X is about 0.17 inches. The amount of torque required to move the first member 12 from the first position to the second position is less than about ten (10) inch pounds. In one example, the torque required is about five (5) inch pounds.

Therefore, an apparatus for an actuation mechanism comprises a first member having a bisecting line, the first member having a generally spherical surface on a first side of the bisecting line and a generally ellipsoidal surface on a second side of the bisecting line. The first member is rotatable around a central point of the bisecting line. The actuation mechanism has a second member having a bisecting line and a truncated ellipsoidal surface on both sides of the bisecting line.

Figure 4:
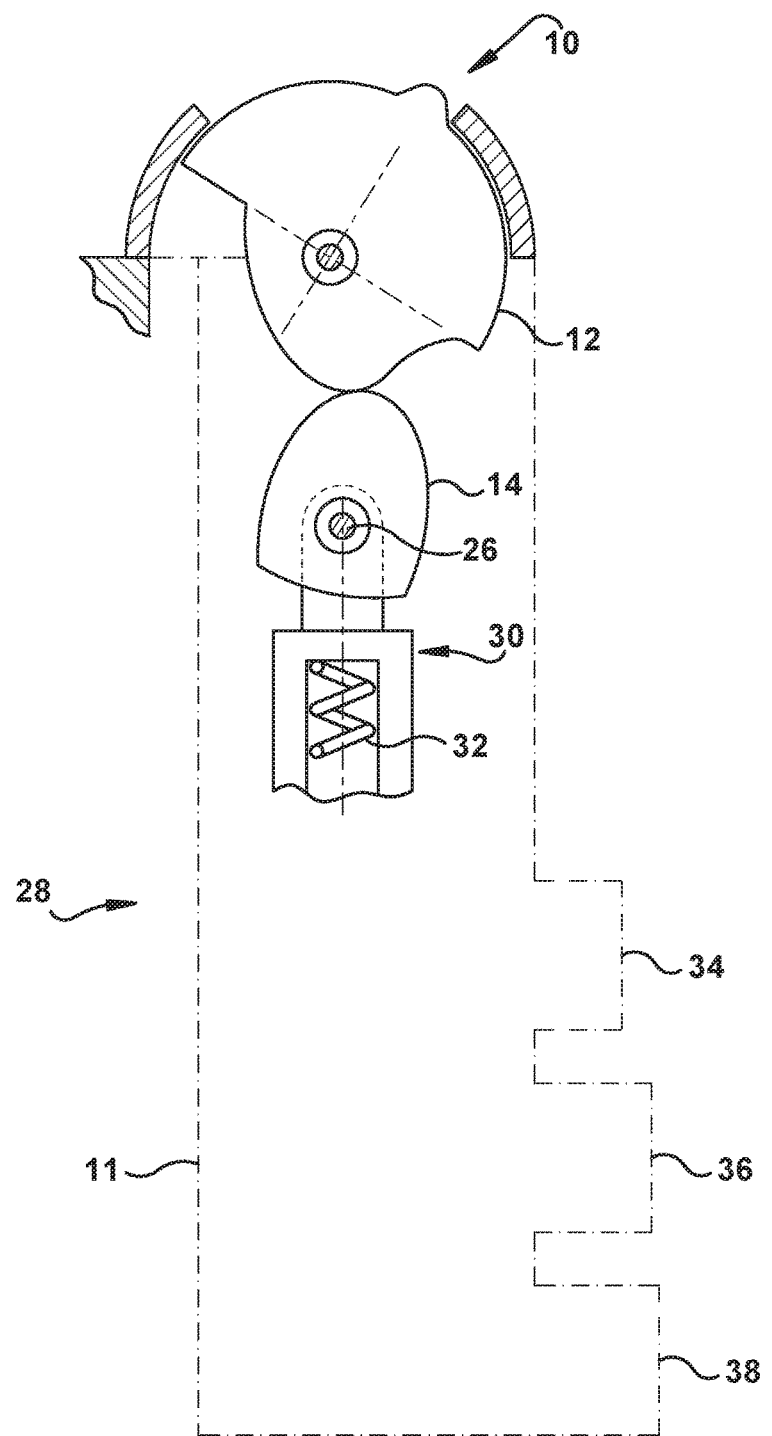
FIG. 4 illustrates a valve with the gear apparatus of FIG. 3 according to one example of the invention.

FIG. 4 illustrates a valve 28 having the gear apparatus 10. The valve 28 may be used to control a brake operation in a pneumatic or other fluid operating system. The gear apparatus 10 is shown in the second, or applied, state. The valve 28 includes the body, or housing 11, and an exhaust port 34, a delivery port 36 and a supply port 38 at a lower portion of the valve 28.

The second member 14 of the gear apparatus 10 is coupled to a longitudinal member 30. The coupling may be via the aperture 26 or the second member 14 and the longitudinal member 30 may be an integral piece.

The longitudinal member 30 is coupled to a biasing member 32. The biasing member 32 may be a spring. The biasing member 32 biases the longitudinal member 30 and thereby the second member 14 and first member 12 into the first position. In the first position, a passage is open in the valve body 28 between the delivery port 36 and the exhaust port 34. The biasing member 32 is compressed when the first member 12 is rotated to the second position. When the longitudinal member 30 is moved linearly as the first member 12 is rotated to the second position, a passage is opened in the valve body 28 between the supply port 38 and the delivery port 36 and the passage between the delivery port 36 and the exhaust port 34 is closed.

The second member 14 seats on the home features 13, 15 and 17, 19 in the first position. In the valve 28, if the second member 14 does not return fully to the first position after actuation, air may be trapped in a delivery circuit. The home features 13, 15 and 17, 19 ensure that the valve will remain in the first position until manually rotated and that the brake pressure that was applied while in the second position is fully exhausted.

Figure 5:
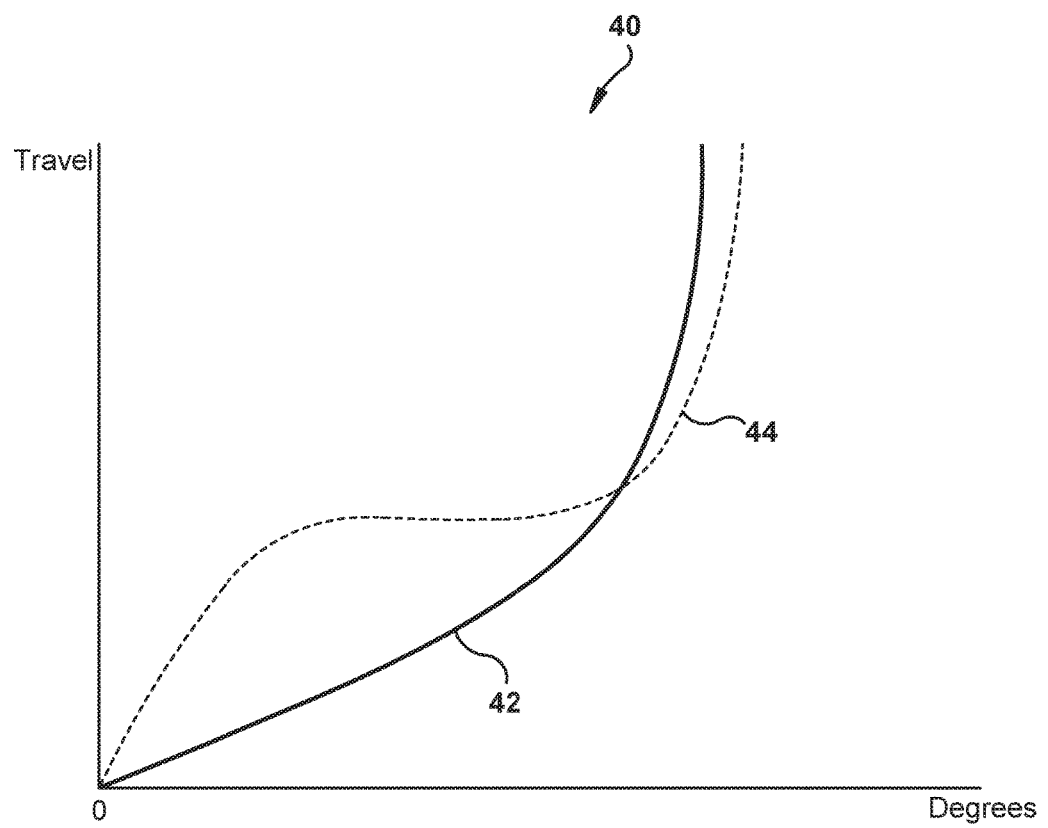
FIG. 5 illustrates a graphical representation of the application of the valve according to an example of the invention.

FIG. 5 illustrates a graph 40 representing travel of the second member 14 on the y axis with respect to the angle of rotation of the first member 12 on the x axis. The gear apparatus 10 of the present invention allows for travel in nearly a parabolic manner through the angular rotation of the first member 12, as shown in line 42. This characteristic allows finer control of the pressure released by the valve 28. This motion is in contrast to the cam/cam follower arrangement of the prior art valve 100, as shown by line 44, that does not have a smooth motion through the rotation of the handle.

Therefore, the present invention is a gear apparatus for a valve that is smaller and smoother in operation than the traditional cam gear valves. An operator interface may be used on the first member to provide a means to manually rotate the first member to actuate the valve since the force required to actuate the valve with the present gear apparatus is less than the traditional cam gear valves. The dial would be smaller than the traditional lever necessary to actuate the cam gear style valves. The wear between the gear first member and gear second member would be less due to the meshing of the gears. By having the first member 12 and the second member 14 ninety degrees out of sync from a typical elliptical gear configuration, the axis of rotation of the driven gear moves in translation along the axis of the valve.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An actuation mechanism for a valve comprising:
    a first member having a bisecting line, the first member having a semi-circular surface on a first side of the bisecting line and a elliptical surface on a second side of the bisecting line, the first member rotatable around a central point of the bisecting line;
    a second member having a bisecting line and a truncated elliptical surface on both sides of the bisecting line, the second member matingly engaging the first member solely at the first member elliptical surface;
    a longitudinal member coupled to the second member; and
    a biasing member coupled to the longitudinal member; wherein the first member is rotated around the central point from a first position to a second position to move the second member and the longitudinal member linearly and the biasing member returns the first member and second member to the first position upon release of the first member.

2. The actuation mechanism as in claim 1, wherein the first member rotates up to about ninety degrees around the center point.

3. The actuation mechanism as in claim 1, wherein the first member elliptical surface and second member elliptical surface are oriented ninety degrees out of phase with each other in the first position.

4. The actuation mechanism as in claim 1, wherein the second member and the longitudinal member are formed as an integral piece.

5. The actuation mechanism as in claim 1, wherein the first member elliptical surface and the second member elliptical surface include teeth and the teeth are matingly engaged throughout the movement from the first position to the second position.

6. The actuation mechanism as in claim 1, wherein the force required to move the first member and second member from the first position to the second position is less than about 10 inch pounds.

7. The actuation mechanism as in claim 1, wherein the first member and second member are formed of a nylon material.

8. The actuation mechanism as in claim 1, wherein the first member is larger than the second member.

9. The actuation mechanism as in claim 1, wherein the longitudinal travel of the longitudinal member from the first position of the first member to the second position of the first member is about 0.17 inches.

10. A valve having a geared actuation mechanism comprising:
    a body having an upper portion and a lower portion;
    a supply port in the lower portion of the body;
    an exhaust port in the lower portion of the body;
    a delivery port in the lower portion of the body;
    a first member having an elliptical surface on a first side of a bisecting line and a semi-circular surface on a second side of the bisecting line, the first member located at the upper portion of the body;
    a second member having a truncated elliptical surface, the second member located at the upper portion of the body, the second member engaging the first member solely at the first member elliptical surface;
    a longitudinal member coupled to the second member and located in the lower portion of the body; and
    a biasing member coupled to the longitudinal member; wherein the first member is actuated manually to move from a first position to a second position while moving the second member and the longitudinal member linearly thereby opening a passage between the supply port and the delivery port; and the biasing member returns the second member and the first member to a first position upon release of the manual actuation, thereby opening a passage between the delivery port and the exhaust port.

11. The valve as in claim 10, further comprising a handle attached to the first member for moving the first member from the first position to the second position.

12. The valve as in claim 10, wherein the valve is a pneumatic control valve.

13. The valve as in claim 10, wherein the second member includes a home feature on the elliptical surface, wherein the second member seats on a complementary home feature in the body of the valve in the first position.

14. A method of actuating a valve with a geared interface comprising:
    manually rotating a first member having a semi-circular surface and an elliptical surface from a first position to a second position;
    matingly engaging a second member having an elliptical surface, wherein the second member moves linearly in response to the manual rotation of the first member and engages the first member solely at the elliptical surface of the first member;
    opening a passage between a supply port and a delivery port as the first member moves from the first position to the second position; and
    opening a passage between the delivery port and an exhaust port as the first member moves from the second position to the first position.

15. The method as in claim 14 further comprising: returning the second member and the first member to the first position upon release of the manual rotation wherein the second member seats on a home feature in the first position.

* * * * *